Figure 1:
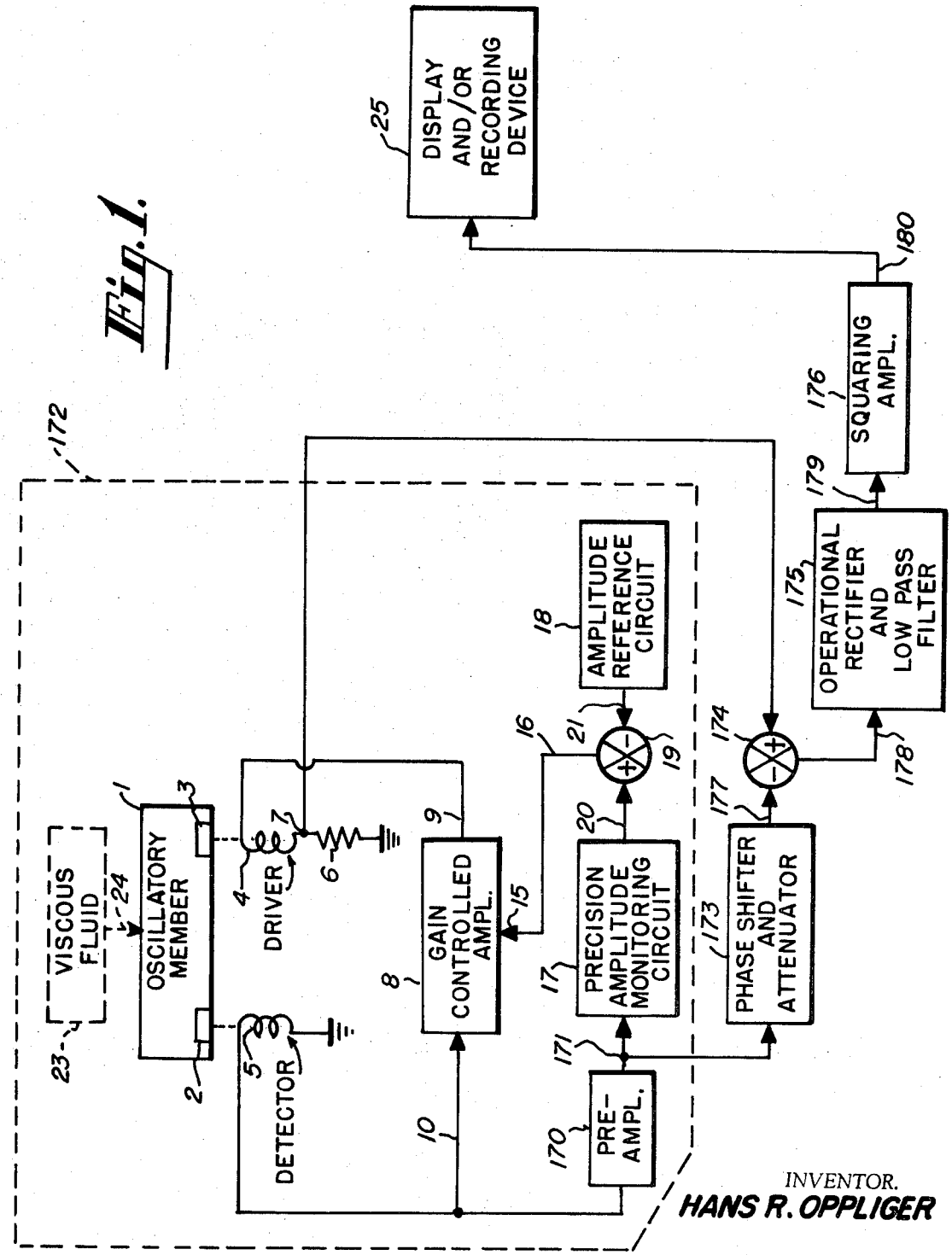

United States Patent
Oppliger

[11] 3,710,614
[45] Jan. 16, 1973

[54] HIGH PRECISION WIDE DYNAMIC RANGE VISCOUS LOSS MEASURING APPARATUS

[75] Inventor: Hans R. Oppliger, Piscataway, N.J.
[73] Assignee: National Metal and Refining Company, Inc., Edison, N.J.
[22] Filed: Sept. 9, 1971
[21] Appl. No.: 178,965

[52] U.S. Cl. ............................................ 73/59, 73/54
[51] Int. Cl. ............................................... G01n 11/16
[58] Field of Search .................................. 73/54, 59

[56] References Cited

UNITED STATES PATENTS

| | | | |
|---|---|---|---|
| 2,550,052 | 4/1951 | Fay | 73/59 |
| 2,696,735 | 12/1954 | Woodward | 73/59 |
| 2,707,391 | 5/1955 | McSkimin | 73/59 |

*Primary Examiner*—S. Clement Swisher
*Assistant Examiner*—Joseph W. Roskos
*Attorney*—Arthur L. Lessler

[57] ABSTRACT

A viscosity measuring system especially useful in pollution and chemical process control applications. A variable gain amplifier drives a magnetic coil which causes a vibratory member to oscillate. The amplitude of the oscillations is sensed as an AC voltage by a transducer, and converted to a DC voltage by an amplitude monitoring circuit. The DC voltage, which represents the instantaneous amplitude of mechanical oscillation, is compared to a reference DC voltage which represents the desired amplitude of oscillation. The resulting error signal is utilized to control the gain of the amplifier in such a manner that the amplitude of mechanical oscillation is maintained constant and equal to the desired amplitude over a wide range of viscous loss. The viscosity of the fluid in which the torsion member is immersed is derived from an output signal which is a measure of the power provided by the amplifier to the magnetic coil in order to maintain the desired constant amplitude of oscillation. Preferably, the output signal is obtained from the voltage developed across a resistor in series with the magnetic coil.

The output signal so obtained is compared to a signal derived from the AC voltage sensed by the transducer, the signals being compared being arranged to be equal when the torsion member oscillates in air. The difference signal resulting from the comparison is a measure of the fluid viscosity, the difference signal being relatively insensitive to electrical noise and to small variations in the electrical parameters of the measuring system.

5 Claims, 2 Drawing Figures

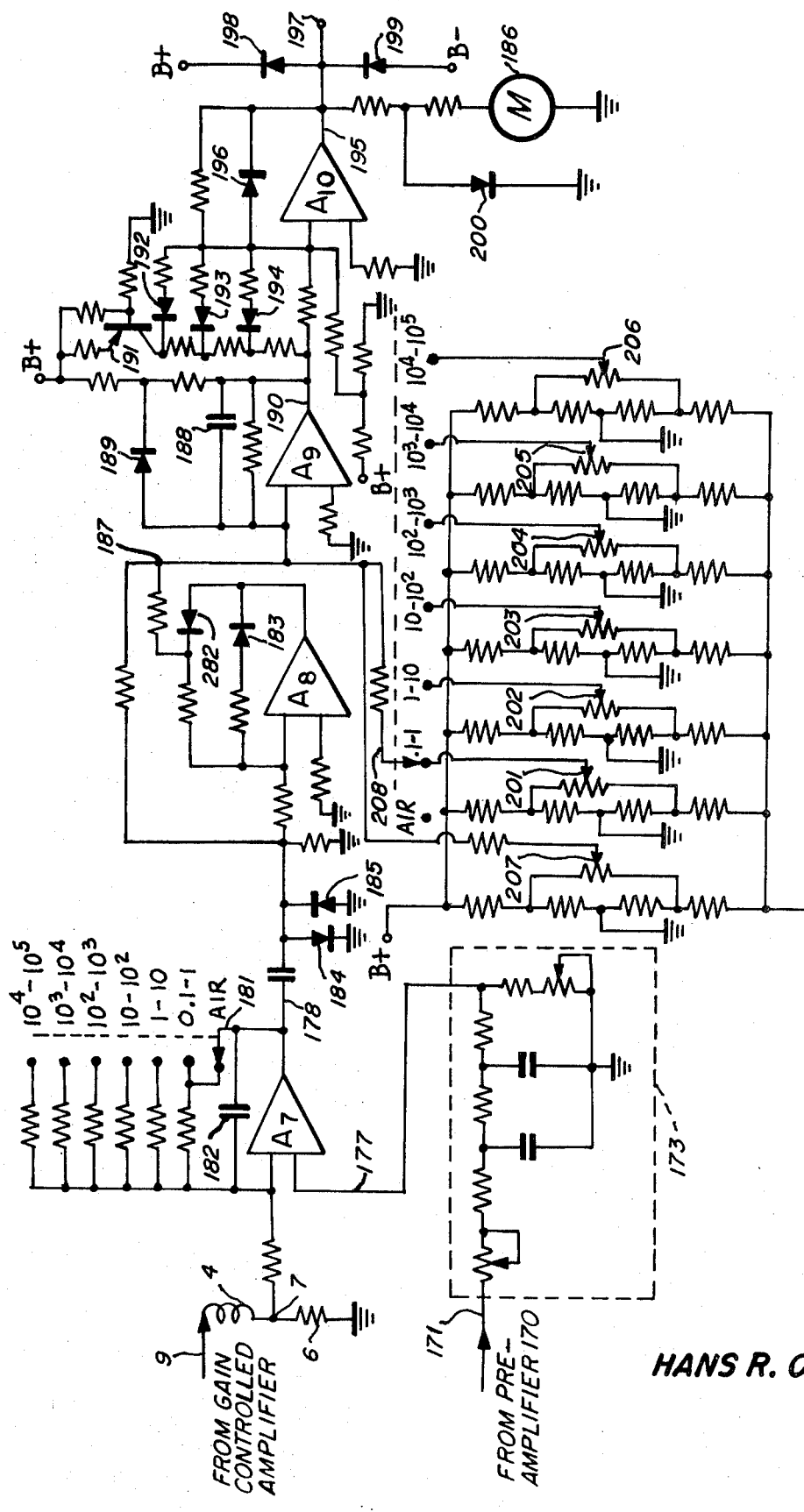

HIGH PRECISION WIDE DYNAMIC RANGE VISCOUS LOSS MEASURING APPARATUS

This invention relates to apparatus for determining the viscous loss in a material, and is especially suitable for measuring the viscosity of a fluid.

The viscous loss measuring arrangement herein described is of the general type described in copending U.S. Pat. application Ser. No. 105,833, filed Jan. 12, 1971, and assigned to the assignee of the instant application. As will be hereinafter described, the apparatus herein disclosed represents an improvement on the arrangement described in the aforementioned copending application, which is incorporated herein and made a part hereof.

The viscosity measuring system described in copending application Ser. No. 105,833 employs a sophisticated feedback control system to maintain the amplitude of mechanical oscillation of a vibrating member at a predetermined value. A viscosity indicating signal is derived by providing a measure of the power which is required to maintain the vibratory member in oscillation at the predetermined amplitude. This system, while providing a considerable improvement over prior art viscous loss measuring techniques, nevertheless suffers from a number of drawbacks, viz.:

a. the viscosity-density product is related to the current through the driving coil in a relatively complex manner involving two parameters rather than by a simple mathematical function involving only a single parameter. As a result, it is necessary to calibrate the system at a large number of points spaced throughout the operating range. Such calibration is tedious and time-consuming, and increases the cost of manufacturing the instrument.

b. Since the viscous losses to be measured may be three to four orders of magnitude lower than the internal friction and other losses in the transducer mechanism, the system must in effect measure relatively small variations in total mechanical loss, severely limiting the resolution of which the system is capable.

c. For the reasons mentioned in paragraph (b), the system is limited in usefulness for process control applications where it is desired to maintain the viscosity of a fluid at a given value, and to measure very small deviations from the desired value.

d. The accuracy of the system is adversely affected by electrical noise and small drifts in electrical circuit parameters, since in order to provide reasonable accuracy it is necessary to maintain the amplitude of mechanical oscillation at a stability level on the order of 100 parts per million.

Therefore, an object of the present invention is to provide a viscous loss measuring system of the general type described in the aforementioned copending application which is relatively easy to calibrate, is suitable for process control applications, and is relatively insensitive to electrical noise and small drifts in electrical circuit parameters.

As herein described, there is provided apparatus for determining the viscous loss in a material. The apparatus comprises a vibratory member which receives power from a driving means to maintain the member in mechanical oscillation. A transducer is provided for detecting the oscillation, and an amplitude monitoring circuit is coupled to the transducer. The amplitude monitoring circuit provides a signal having a value manifesting the amplitude of mechanical oscillation. The apparatus includes means for providing an amplitude reference signal having a value corresponding to a desired amplitude of mechanical oscillation. A comparator provides an amplitude correction signal having a value determined by the difference between the signal provided by the amplitude monitoring circuit and the amplitude reference signal. The amplitude correction signal is applied to the driving means so that the driving means supplies sufficient power to the vibratory member to overcome the viscous loss and maintain the member in mechanical oscillation at the desired amplitude. An output signal is provided having a value which is a measure of the power supplied to the vibratory member by the driving means. Signal translating means is provided for furnishing second and third signals having amplitudes proportional to (i) the mechanical oscillation detected by the transducer, and (ii) the output signal respectively. The amplitudes of the second and third signals are arranged to be equal when the mechanical oscillation takes place in a given medium. A difference circuit provides a fourth signal which is a measure of the difference between the amplitudes of the second and third signals.

In the drawing:

FIG. 1 illustrates, in block diagram form, apparatus according to a preferred embodiment of the present invention as employed for measurements of fluid viscosity. The circuitry within the dashed lines is similar to that described in copending application Ser. No. 105,833; and FIG. 2 shows a preferred form of the electrical control circuitry which may be utilized in a portion of the apparatus shown in FIG. 1.

The apparatus of the present invention is illustrated in generalized form in the block diagram of FIG. 1, wherein the oscillatory or vibratory member 1 is supported by any desired means (not shown) and is provided with magnetic portions 2 and 3, which may be inset into or fixed to one or more surfaces of the member 1. Obviously, in the event the member 1 comprises a magnetic material, no separate magnetic portions 2 and 3 are required.

The oscillatory member 1 is excited and maintained in mechanical oscillation by a driver coil 4, situated in proximity to the magnetic portion 3.

The mechanical oscillation of the member 1 is sensed by the detector coil 5, which is situated adjacent the magnetic portion Instead of a magnetic driving arrangement as illustrated in FIG. 1, the oscillatory member 1 may alternatively be driven by a piezoelectric or magnetostrictive transducer, or other suitable arrangement. Similarly, piezoelectric, Hall effect, capacitive, differential transformer or other transducing means may be substituted for the detector coil 5.

The current supplied to the magnetic coil driver 4 is monitored by means of the series resistor 6, which provides an output voltage at terminal 7 thereof which is a measure of the driver coil current and therefore of the power supplied to the coil. The value of the resistor 6 is selected to be sufficiently small so that it does not interfere with operation of the mechanical oscillation control circuitry.

The amplitude of mechanical oscillation of the oscillatory member 1 is maintained at a predetermined desired value by means of an amplitude correction signal supplied on line 16 to the gain control terminal 15 of the amplifier 8.

The amplitude correction signal is provided by a precision amplitude monitoring circuit 17, an amplitude reference circuit 18, and a comparator 19. The amplitude monitoring circuit 17 converts the output of the detector coil (which is provided to the circuit 17 on line 171 via preamplifier 170) to a DC voltage corresponding to the amplitude of the signal detected by the detector coil and therefore to the amplitude of mechanical oscillation of the vibratory member 1. This DC voltage is supplied to the comparator 19 on line 20.

The amplitude reference circuit 18 provides a DC voltage to the comparator 19 on line 21 which corresponds to the desired amplitude of oscillation. Preferably, the value of the DC voltage developed by the amplitude reference circuit 18 is manually adjustable. This adjustment remains constant for any given set of loss measurements over the desired range, which can be many orders of magnitude.

The amplitude monitoring circuit 17 must introduce only a very small phase shift into the gain control loop, if instability of the apparatus is to be avoided. A conventional peak detection circuit, or one of the operational type, has been found to be unsuitable in most applications, since the time constant introduced by the requisite filter circuit introduces excessive phase shift into the gain control loop and results in the aforementioned instability. Rather, we have found that it is preferable to employ a sample and hold circuit which is gated at intervals corresponding to the peaks of the voltage waveform developed across the detector coil 5, to provide the amplitude monitoring function. Such a circuit is capable of responding to amplitude variations within a single cycle, and therefore introduces extremely small phase shift into the gain control loop. The large gain reduces the transducer response time by at least an order of magnitude. This accounts for the rapid response to viscous loss changes.

It is helpful to consider operation of the closed electromechanical gain control loop without the precision amplitude monitoring circuit 17 and amplitude reference circuit 18. Although temporarily manually controllable, the AC current in the loop will either increase or decrease because of positive feedback and the time constant for response to viscosity changes will be long, typically of the order of many seconds. When the precision amplitude monitoring circuit 17 (which provides negative feedback) and amplitude reference circuit 18 are connected to the gain control loop, as in FIG. 1, the current in the loop becomes stable and the time constant becomes very small (typically of the order of fractions of a second) for response to viscosity changes.

The output voltage at terminal 7 is a function of the transducer arrangement that includes oscillatory member 1 and coils 4 and 5, and is independent of other non-linear elements in the system. High feedback gain and instantaneous response provided by precision amplitude monitoring circuit 17 insure fast and accurate response to viscosity changes.

The output of the detector coil 5 is fed to the input terminal 10 of the gain controlled amplifier 8, the amplifier output at terminal 9 being coupled in turn to the driver coil 4. A closed loop is provided by magnetic coupling from the driver coil 4 to the magnetic portion 3, mechanical coupling from the magnetic portion 3 to the magnetic portion 2 by way of the oscillatory member 1, and magnetic coupling from the magnetic portion 2 to the detector coil 5. Thus a closed loop is provided which oscillates at a frequency substantially equal to the natural frequency of mechanical oscillation of the vibratory member 1. As previously mentioned, the mechanical amplitude of this mechanical oscillation is maintained (at a value corresponding to the DC voltage developed on line 21 from the amplitude reference circuit) by the amplitude monitoring circuit 17 and the comparator 19, the output of which varies the gain of the amplifier 8 in such a manner as to maintain the desired mechanical oscillation amplitude.

Under conditions where the oscillatory member 1 is situated in a vacuum or an extremely low viscosity fluid such as air, the voltage developed at terminal 7 of resistor 6 is a measure of the internal friction of the member 1 itself.

Where, instead of measuring internal friction it is desired to measure fluid viscosity, the oscillatory member 1 of FIG. 1 is made of a material which exhibits extremely low internal friction, and is immersed in a sample of the fluid 23 whose viscosity is to be determined. The line 24 represents mechanical coupling between the viscous fluid 23 and the oscillatory member 1.

The fluid 23 exerts a damping force, basically a frictional effect, on the oscillatory member 1, so that the power supplied to the driver coil 4 by the amplifier 8 to maintain the desired amplitude of mechanical oscillation (as determined by the DC voltage developed by the amplitude reference circuit 18 on line 21) is a measure of the viscosity of the fluid 23. More specifically, the viscosity-density product of the fluid 23 is related to the current through the driver coil 4 and the resistor 6, i.e. to the voltage developed at terminal 7, by the following equation:

$$\sqrt{\eta p} = k(i - i_o) \quad (1)$$

where $\eta$ is the fluid viscosity, $p$ is the fluid density, $k$ is a proportionality constant, $i$ is the current through the driver coil 4 and resistor 6, and $i_o$ is a constant determined by mechanical and electrical losses in the measuring apparatus when the vibratory member 1 oscillates in a vacuum or a very low viscosity medium such as air, or alternatively in a universal standard viscosity material such as water or other standard Newtonian liquids.

The circuitry so far described, and contained within the dashed block 172, operates in the same manner as the arrangement shown in FIG. 1 of copending application Ser. No. 105,833, corresponding blocks of FIG. 1 of the instant application having the same reference numerals as in FIG. 1 of the aforementioned copending application. In the copending application Ser. No. 105,833, the preamplifier 170 is not needed, the necessary gain being provided by the internal circuitry of the precision amplitude monitoring circuit 17.

Since Equation (1) represents a relatively complex function, and since $i_o$ may vary from instrument to instrument, it is ordinarily necessary to calibrate the viscosity measurement system at a large number of points when the voltage appearing at terminal 7 is utilized as a measurement of viscosity. In addition, the constant term $i_o$ may vary as a result of electrical noise and small drifts in parameters of the electrical circuitry, thus introducing measurement errors into the system. The sensitivity of the system to such errors is relatively large, since, especially where low viscosities are to be measured, the value of $(i - i_o)$ may be 3 to 4 orders of magnitude smaller than $i_o$.

The aforementioned disadvantages are overcome by means of the circuitry encompassed in blocks 173 to 176, the operation of which will now be described.

The gain of the preamplifier 170 is sufficiently great so that the amplified AC transducer signal appearing on line 171 has an amplitude greater than that of the output signal appearing at terminal 7. However, the amplified transducer signal and the output signal are of the same frequency and differ in phase by an angle which is dependent upon the properties of the electromechanical coupling system comprising oscillatory member 1, driver coil 4 and detector coil 5. We have discovered that this phase shift is not significantly affected by the viscosity of the fluid 23 in which the oscillatory member 1 is immersed, over a wide range of fluid viscosities.

The phase shifter and attenuator 173 reduces the amplitude of the amplified transducer signal on line 171, and at the same time, shifts the phase of this signal.

The phase shift and attenuation introduced by the circuit 173 are adjusted so that, when the oscillatory member 1 is vibrating in a given medium such as air, the amplitude of the output signal appearing at point 7 is equal to the amplitude of the processed transducer signal appearing on line 177, and the phase relationship of these two signals is such that their zero crossovers occur in synchronism. These signals are then subtracted from each other in the comparator 174, the resulting difference signal on line 178 being provided as an input to the operational rectifier and low-pass filter 175.

The signals at point 7 and on line 177 may be in phase with each other, in which case the comparator 174 subtracts one signal from the other to provide a resultant difference signal. Alternatively, the signals may be 180 degrees out of phase with respect to each other, in which case the comparator 174 may provide the desired difference signal on line 178 by adding the two signals together.

The signal which appears on line 178 is an AC voltage, the amplitude of which is zero when the oscillatory member 1 is immersed in the given medium which is to serve as the viscosity reference. Normally, this reference medium is air or vacuum. However, for process control applications where it is desired to maintain the viscosity of a fluid at a predetermined value, the phase shifter and attenuator 173 may be adjusted so that the amplitude of the difference signal on line 178 is zero when the oscillatory member 1 is immersed in a fluid having the desired reference viscosity.

For example, in the adjustment of automobile carburetors for minimal atmospheric pollution, it is necessary to supply the carburetors with gasoline having a precisely controlled viscosity. For such an application, the phase shift and attenuator 173 may be adjusted so that the amplitude of the difference signal on line 178 is zero when the oscillatory member 1 is immersed in gasoline of the desired viscosity. In this manner, small variations in the viscosity of the gasoline in which the oscillatory member 1 is immersed will result in deviations from zero amplitude of the AC difference signal appearing on line 178, so that the amplitude of the signal on line 178 will be highly sensitive to small viscosity variations.

In effect, by means of the phase shifter and attenuator 173, and the comparator 174, the amplitude of the signal detected by the transducer coil 5 has been normalized with respect to the amplitude of the output signal at terminal 7, so that any disturbance which alters the signals on line 171 and at point 7 by the same percentage will be cancelled out, and will not effect the amplitude of the viscosity representing difference signal appearing on line 178. Such (undesired) effects include electrical circuit noise, as well as drifts in the electrical parameters of the circuitry included within the dashed box 172, including small changes in the amplitude reference signal appearing on line 21. Since such undesired electrical disturbances tend to affect both the signal on line 171 and the signal at point 7 by the same percentage, they do not substantially affect the amplitude of the viscosity indicating signal on line 178.

An additional effect of the phase shifter and attenuator 173 and the comparator 174 is simplification of the calibration procedure for the viscosity measurement system. The effect of this circuitry is to essentially cancel out the "constant" term $i_o$ which appears in Equation (1), so that in effect the viscosity-density product is related to the amplitude of the AC difference signal on line 178 by the following equation:

$$\sqrt{\eta \rho} = KE \qquad (2)$$

Thus the mathematical relationship between the viscosity-density product and viscosity indicating voltage is simplified over the relationship obtained from the system described in copending application Ser. No. 105,833 so that the system herein described may be calibrated merely by determining the values of E and viscosity-density product at two points, since only a single curve fitting equation (2) can be drawn through any two given points. Thus, the task of calibrating the viscosity measurement system herein described is considerably simpler than the calibration of the arrangement described in the aforementioned copending application.

In order to convert the AC viscosity indicating difference signal on line 178 to a DC signal which can be read on a meter or readily displayed on another indicating element or, if desired, fed to a recording device, the AC difference signal on line 178 is fed to an operational rectifier and low-pass filter 175.

The operational rectifier within the block 175 converts the AC difference signal on line 178 to a pulsating DC waveform the amplitude of which is accurately proportional to the amplitude of the AC difference signal on line 178. The low-pass filter within the block 175 substantially eliminates ripple from the pulsating DC waveform and provides a smooth DC viscosity indicating output signal on line 179.

The DC viscosity indicating signal on line 179 varies in accordance with the viscosity-density product of the viscous fluid 23 in which the oscillatory member 1 is immersed, substantially in the manner described in Equation (2) above. In order to provide a DC signal which varies in linear fashion with viscosity-density product, the DC voltage on line 179 is fed to a squaring amplifier 176.

In order to provide a plurality of viscosity measurement ranges, the gain of the comparator 174 may be varied by means of a suitable selector switch.

Suitable circuitry for realizing the arrangement of blocks 173 to 176 is shown in FIG. 2 of the drawing.

In FIG. 2, the phase shifter and attenuator 173 comprises the resistance-capacitance network shown in dashed lines. The various operational amplifiers $A_7$ to $A_{10}$ are of the differential input type, i.e. the amplifiers are constructed so that under open loop conditions the output voltage of each amplifier is determined by the amplifier open loop gain multiplied by the difference between the potentials applied to the two input terminals thereof. The polarity of the output voltage of each amplifier is dependent upon the polarity of the difference between the input voltages thereto. In the arrangement shown in FIG. 2, the upper input line to each operational amplifier is connected to the non-inverting terminal thereof, while the lower input line is connected to the inverting terminal thereof. These operational amplifiers may, for example, be the type sold under the trade designation μA709 by Fairchild Semiconductor Division of Fairchild Camera and Instrument Corporation, Mountain View, California.

In the arrangement shown in FIG. 2, the operational amplifier $A_7$ and its associated circuitry acts as the comparator 174, the selector switch 181 varying the closed loop gain of the amplifier to provide various viscosity-density product measurement ranges. The capacitor 182 helps to prevent parasitic oscillations.

The amplifier $A_8$ and its associated circuitry corresponds to the operational rectifier within the block 175 shown in FIG. 1, rectifying action being provided by the diodes 182 and 183. The diodes 184 and 185 act as limiters to prevent overloading of the operational amplifiers $A_8$ to $A_{10}$ and the viscosity indication meter 186.

The pulsating DC signal provided at the output terminal 187 of the operational rectifier $A_8$ is supplied to an input terminal of the operational amplifier $A_9$, which operates as a low-pass filter. Diode 189 acts to prevent overloading of the meter 186 for positive signals. The output of the low-pass filter amplifier $A_9$ on line 190 is fed to the squaring amplifier $A_{18}$, which operates in conjunction with constant current source transistor 191 and diodes 192–194 to provide a squared DC output voltage at terminal 195 thereof. Diode 196 acts to prevent overloading of meter 186 for negative signals. The output of amplifier $A_{10}$ on line 195 is a viscosity indicating DC signal which varies linearly with variations in viscosity-density product. This DC signal is fed to DC voltmeter 186 and to output terminal 197. Diodes 198 to 200 act to prevent damage to meter 186 and to amplifier $A_{10}$ due to inadvertent application of improper voltage to terminal 197.

In order to compensate for small irregularities in the electric circuitry which vary with the position of the viscosity-density product range selector switch 181, separate zero adjustment potentiometers 201-206 are provided for each measurement range. An additional zero set potentiometer 207 is provided for initial adjustment of the system when the oscillatory member 1 is immersed in air. The desired zero set potentiometer is coupled to the amplifier $A_9$ by means of the selector switch 208, the position of which is mechanically synchronized with the position of the range selector switch 181.

In the arrangement herein described, the member 1 oscillates at its natural frequency in the viscous fluid 23. For some purposes, as described in the aforementioned copending application Ser. No. 105,833, it is desirable to measure viscous loss at other frequencies. This may be accomplished by coupling the input terminal of the gain controlled amplifier 8 to a variable frequency oscillator, such as the oscillator 14 described in said copending application.

However, since the required phase shift and attenuation of the circuit 173 will be different at different frequencies, this arrangement cannot be used in conjunction with such a variable frequency technique. Instead, the signals on line 171 and at point 7 must first be converted to DC signals (by separate operational rectifiers and low-pass filters) before they are subtracted from one another in the comparator 174. Such an arrangement requires an additional operational amplifier and low-pass filter, and is therefore somewhat more susceptible to electrical noise and small electrical parameter drifts than is the arrangement shown in FIG. 1; however, this modification is nevertheless a considerable improvement on the arrangement described in the aforementioned copending application.

I claim:

1. In an apparatus for determining viscous loss in a material, said apparatus comprising:

a vibratory member;

driving means for supplying power to maintain said member in mechanical oscillation;

a transducer for detecting said oscillation;

an amplitude monitoring circuit coupled to said transducer for providing a first signal having a value manifesting the amplitude of said oscillation;

means for providing an amplitude reference signal having a value corresponding to a desired amplitude of mechanical oscillation;

a comparator for providing an amplitude correction signal having a value determined by the difference between the value of said first signal and the value of said amplitude reference signal;

means for applying said amplitude correction signal to said driving means, so that said driving means supplies sufficient power to said member to overcome said viscous loss and maintain said member in mechanical oscillation at said desired amplitude; and means for providing an output signal having a value which is a measure of the power supplied to said member by said driving means, the improvement comprising signal translating means for providing second and third signals having amplitudes proportional to (i) the oscillation detected by said transducer and (ii) said output signal respectively, the amplitudes of said second and third signals being equal when said mechanical oscillation takes place in a given medium, and a difference circuit for providing a fourth signal which is a measure of the difference between the amplitudes of said second and third signals.

2. The improvement according to claim 1, wherein said given medium is air.

3. The improvement according to claim 1, wherein said second and third signals have the same frequency as said detected oscillation and said output signal, said signal translating means including a phase shifter for shifting the phase of at least one of said second and third signals so that the zero crossover of said second and third signals occur in synchronism.

4. The improvement according to claim 3, wherein said difference circuit includes means for differentially combining said second and third signals to provide a difference signal, and means for operationally rectifying and filtering said difference signal to provide a DC viscosity indication signal.

5. The improvement according to claim 4, further comprising a squaring circuit responsive to said viscosity indication signal, said squaring circuit providing a DC output signal which varies linearly with change in fluid viscosity, and means for utilizing the output of said squaring circuit.

* * * * *